Nov. 10, 1942.     R. A. GOEPFRICH     2,301,272
BRAKE
Filed June 5, 1940     2 Sheets-Sheet 1

INVENTOR
RUDOLPH A. GOEPFRICH
BY
M. W. McConkey
ATTORNEY

Nov. 10, 1942.   R. A. GOEPFRICH   2,301,272
BRAKE
Filed June 5, 1940   2 Sheets-Sheet 2

INVENTOR
RUDOLPH A. GOEPFRICH
BY
ATTORNEY

Patented Nov. 10, 1942

2,301,272

UNITED STATES PATENT OFFICE 2,301,272

BRAKE

Rudolph A. Goepfrich, South Bend, Ind., assignor to Bendix Aviation Corporation, South Bend, Ind., a corporation of Delaware Application June 5, 1940, Serial No. 338,897

7 Claims. (Cl. 188—79.5)

This invention relates to brakes, and more particularly to adjustment means for brakes.

Devices have been provided for automatically adjusting vehicle brakes. While there are numerous advantages in an automatic adjustment for brakes, there is at least one important disadvantage. Since the brakes will adjust automatically, the pedal feel will remain the same until the brake lining is completely worn down and the metal of the brake shoe contacts the brake drum. Because of this danger, it is desirable to provide means for warning the operator when the brake linings are worn out.

It is, therefore, one of the objects of this invention to provide a device for warning the operator of a vehicle when the brake linings are substantially worn.

A second object of my invention is to combine such a warning device with a device for automatically adjusting the brakes of a vehicle to maintain a nearly constant distance between brake lining and brake drum.

A further object of my invention is to provide means for rendering the normally operative automatic adjustment means of a brake inoperative when the brake no longer can be safely adjusted without danger of bringing the metal of the brake shoes into contact with the brake drum.

A still further object of my device is to provide, in combination with a hydraulic brake having the above mentioned features, means to prevent the operator from moving the shoes into contact with the drum by pumping the hydraulic system.

Further objects and particular features of my invention will be apparent during the course of the following description, reference being had to the accompanying drawings, in which.

My invention will be described as applied to a brake of the shiftable anchorage type, and the automatic adjustment described will be similar to that illustrated in Patent No. 2,060,429 of George L. Smith. The ideas embodied in my invention are capable of being appropriated in any automatically adjustable brake.

Figure 1:
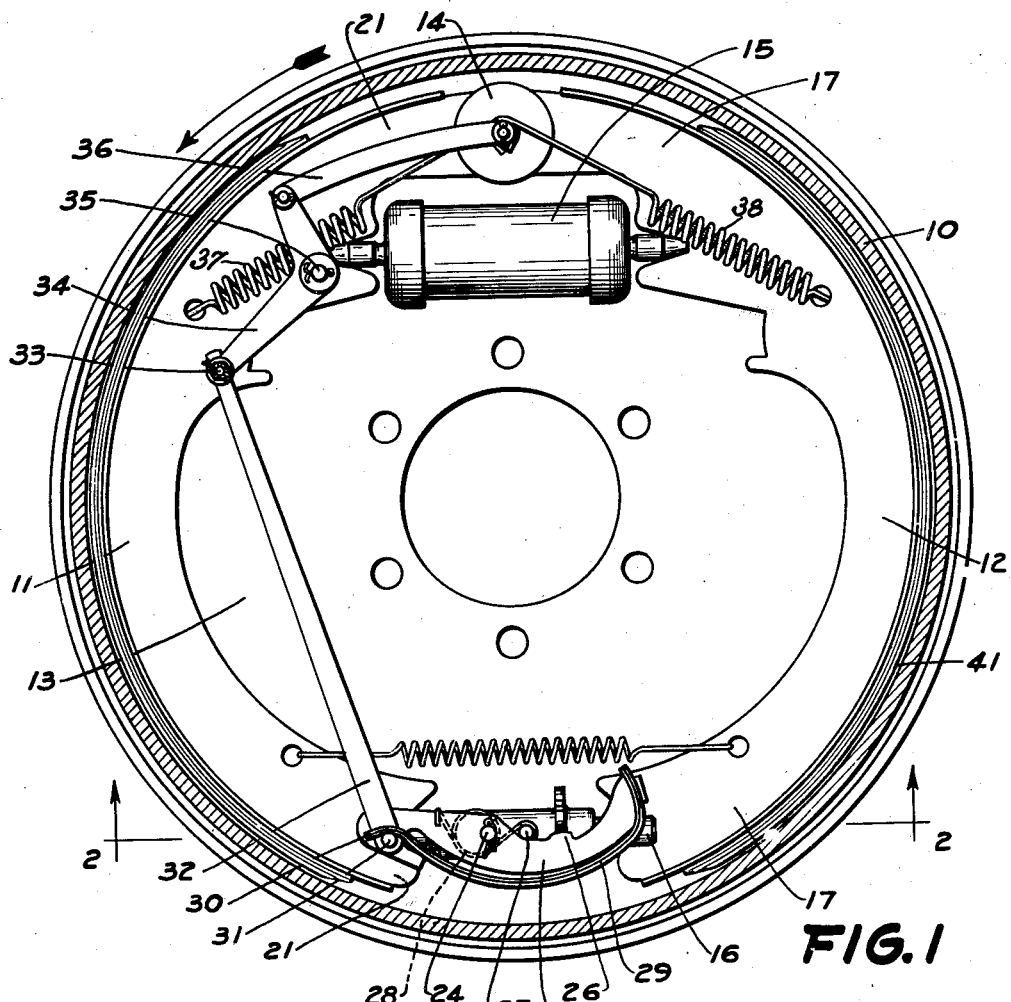
Figure 1 shows in elevation a brake assembly incorporating my invention.

Referring to Figure 1, the brake assembly is generally composed of a rotatable brake drum 10 and brake shoes 11 and 12 which are supported on a non-rotatable backing plate 13. The backing plate 13 carries an anchor post 14 against which either of the shoes may anchor, and the plate 13 also carries a hydraulic cylinder 15 of the well-known type for expanding the shoes into engagement with the brake drum.

The two shoes 11 and 12 are connected by an adjusting mechanism consisting of a screw threaded clevis bolt 16 secured to the web 17 of shoe 12. The bolt 16 is threaded into a sleeve 18 which is provided with a ratchet wheel 19. A fitting 20 rigidly clamped to the web 21 of the shoe 11 has a sleeve 22 which is provided with a socket to receive an extension 23 from the ratchet wheel sleeve 18. The ratchet wheel 19 may therefore be rotated to spread apart the sleeve 22 and the clevis bolt 16 which are fixed to shoes 11 and 12 respectively.

A projection 24 which extends from the sleeve 22 serves as pivot for a ratchet pawl 25. The pawl 25 has a lip 26 engaging the teeth of the ratchet wheel 19. A stud 27 mounted on the sleeve 22 limits the upward movement of the pawl 25 and serves to hold one end of a torsion spring 28, the other end of which catches the pawl 25 and acts to rotate the pawl against the stud 27.

A thermo-sensitive lever arm 29 is secured to the right end of the pawl 25 and is located close to the braking surface of the drum to insure a rapid transmission of heat from the brake drum to the lever arm 29. The lever arm 29 is a bi-metallic element having a metal with a high coefficient of expansion nearest the drum and a metal with a comparatively low coefficient of expansion on the side away from the drum. A rise in temperature will therefore cause the lever arm 29 to bend, moving its left end 30 upward.

The left end 30 of the lever arm 29 is forked and the forks thereof are hooked over a pin 31. The pin 31 passes through the left end of the pawl 25 and also passes through the lower end of a link 32 which is attached at 33 to one end of a bellcrank lever 34. The bellcrank lever 34 is pivoted at 35 on the web 21 of the shoe 11 and the upper end of the bellcrank lever is connected to a link 36 which is in turn connected to the anchor post 14.

The device thus far described serves as the means for automatically adjusting the brake and its operation will now be briefly described. As shown by the arrow, a forward movement of the vehicle causes a counterclockwise movement of the brake drum. When the operator applies the brakes pressure fluid entering the hydraulic cylinder 15 spreads the shoes 11 and 12 to force them into engagement with the brake drum. Since the shoe 11 is a primary, or applying shoe, it will move out against the drum and will move away from the anchor post 14, while the shoe 12 will anchor against the post 14. The movement of the shoe 11 away from the anchor post causes the bellcrank lever to pivot about the point 35 and exert an upward force on the link 32. The pin 31 exerts a pull on the left end 30 of the lever arm 29 tending to swing the pawl 25 about its pivot point 24. It should be noted at this point that the pin 31 slides in the lost motion slot on the left end of the pawl 25 so that the upward pull exerted by the link 32 is exerted on the lever arm 29 but not directly through the pin 31 on the pawl 25. If the gap opened up between the shoe 11 and the anchor post 14 is great enough the lip 26 on the pawl 25 will be moved by the lever arm 29 to pick up a new tooth on the ratchet wheel 19.

A pair of return springs 37 and 38 are provided for swinging the shoes back into proper position after the brakes have been released. Therefore, after release of the brakes, the spring 45 will swing the end of shoe 11 back against the anchor post 14. At this time, two forces will be exerted to swing the pawl 25 back to its original position and turn the ratchet wheel 19 to increase the spread between the lower ends of shoes 11 and 12. The first of these forces is that exerted by the torsion spring 28 and the second force is that exerted by the link 36; the bellcrank lever 34, the link 32 and the pin 31 against the left end of the pawl 25 tending to aid the torsion spring 28 in rotating the pawl 25 about its pivot point 24.

The function of the bimetallic lever arm 29 is to prevent over-adjustment of the brakes. As has already been explained, excessive heat caused by friction between the shoes and the drum will cause the lever arm 29 to bend, moving its left end 30 upward. This has the effect of creating a lost motion between the left end of the lever and the pin 31, thus preventing the lever arm 29 from swinging the pawl 25 to pick up a new tooth on the ratchet wheel 19 at times when the brake is excessively hot.

Figure 2:
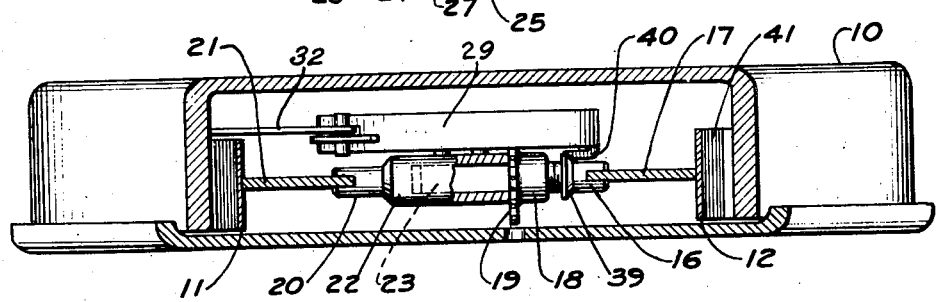
Figure 2 is a view taken on the line 2—2 of Figure 1.

As shown most clearly in Figure 2, a cam 39 is provided on the clevis bolt 16 between the threaded portion thereof and the web of shoe 12. A leg 40 extends outward from the adjusting lever 29 at a point adjacent the cam 39. As successive adjustments of the brake are made, the cam 39 will gradually move to the right following the web of the shoe 12. The cam 39 may be so positioned on the clevis bolt 16 that, at a time when the lining 41 on the shoe 12 has been worn down until the metal of the shoe almost comes into contact with the brake drum, the cam 39 will contact the leg 40 on the lever 29 and move the lever 29 together with the lip 26 of the pawl 25 away from the ratchet wheel 19. Since the lip 26 is no longer in engagement with the ratchet wheel 19, further adjustments of the brake will not be made. The operator of the vehicle will therefore be warned by a comparatively soft pedal and poor braking effect that his brakes require relining.

Figure 3:
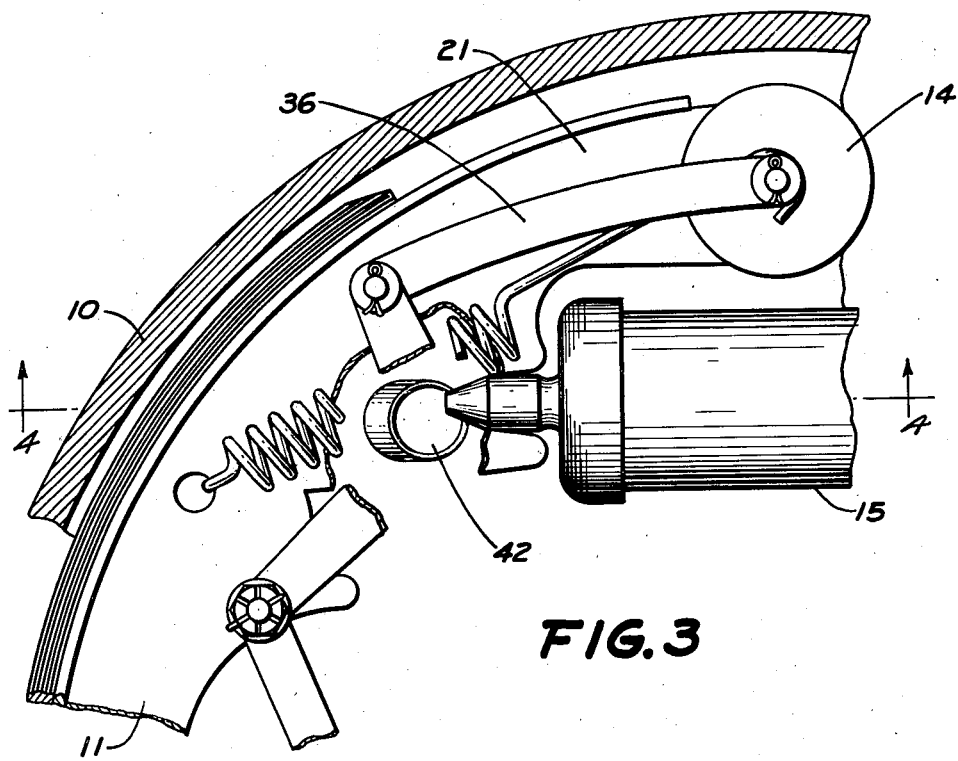
Figure 3 shows in closeup a portion of the brake of Figure 1 with part of a brake shoe cut away.
Figure 4:
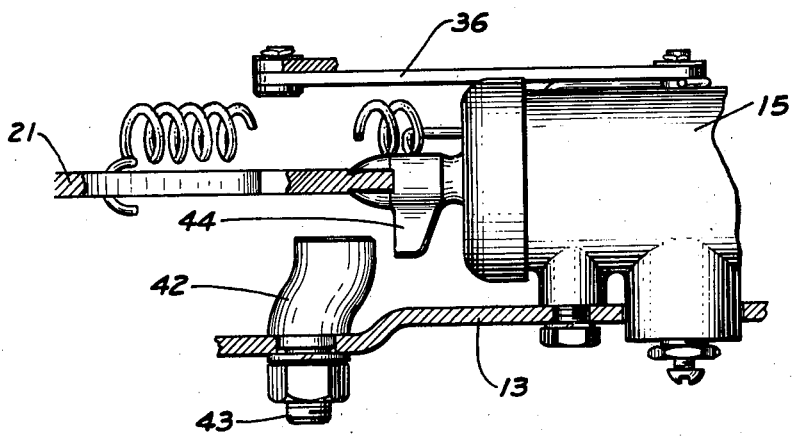
Figure 4 is a view taken on the line 4—4 of Figure 3.

In a hydraulic brake system as the one used in describing my device, it is possible for the operator to pump the brake and bring the shoes into contact with the drum even though the lining has worn down. The pumping process will not be specifically described, as those familiar with the brake art are aware that rapid manipulation of the brake pedal can force new liquid from the reservoir into the hydraulic system before the liquid already in the system has time to return from the wheel cylinders. In order to prevent pumping of the brakes, I have provided the device shown in Figures 3 and 4. A stop 42 is fixed by a bolt 43 to the backing plate 13 and placed in such a position that a projection 44 on the brake applying link of the hydraulic cylinder 15 will contact the stop 42 and prevent further brake applying movement of the piston link. The contact between the stop 42 and the link 44 occurs just before the brake pedal reaches the floor boards.

It will be seen that I have provided first of all a means for preventing further automatic adjustment of the brakes after the linings have been worn out and that I have added to that a means for preventing the operator from ignoring the warning given by the first named means.

It will be understood that my invention above described is capable of numerous uses. Therefore it is my desire not to limit the scope of my invention except by the terms of the appended claims.

I claim:

1. A brake comprising a brake drum, a backing plate, a brake shoe mounted on the backing plate, automatic means for repositioning the shoe whenever necessary to maintain a substantially constant clearance between the outer surface of the shoe and the brake drum, a cylinder for moving the shoe into contact with the drum, a thrust link between the cylinder and the shoe, said link having a projection thereon, and an abutment on the backing plate adapted to contact said projection and prevent movement of the link beyond a predetermined distance, said automatic repositioning means having the effect of lengthening the distance between the thrust link projection and the cylinder whenever the said repositioning means operates.

2. In combination, an automatically adjustable brake, means responsive to the temperature of the brake controlling the adjustment thereof, means operative upon a predetermined extent of adjustment to render said adjustment means inoperative, brake applying means, and means operative at the time adjusting means is rendered inoperative for limiting the brake applying movement of said last named means.

3. A brake comprising a brake drum, a pair of brake shoes having brake lining associated therewith, a hydraulic cylinder between the shoes at one end thereof, an adjusting device between the shoes at the other end and arranged to increase the distance between the ends of the shoes as the brake lining wears, a lever for actuating the said adjusting device, and a cam on the adjusting device for moving the lever to prevent further adjustment after the brake shoes have been spread a predetermined distance by the adjusting device.

4. An automatically adjustable brake comprising a brake shoe, an adjustment mechanism connected to one end of the shoe, said adjustment mechanism including two separable parts and a ratchet wheel, a control member engaging the ratchet wheel, connections for at times moving the control member to turn the ratchet wheel, and means for moving the control member away from the ratchet wheel when the parts of the adjusting device have been separated a predetermined distance.

5. An automatically adjustable brake comprising automatic means for positioning the brake parts to maintain a substantially constant brake clearance, means responsive to the temperature of the brake for preventing over-adjustment of the parts thereof, means operative upon a predetermined extent of adjustment to render said automatic means inoperative, brake applying means, and means operative at the time the adjusting means is rendered inoperative for limiting the brake applying movement of said last named means.

6. An automatically adjustable brake comprising a brake shoe, an adjustment mechanism connected to one end of the shoe and including two separable parts, a control member for the adjustment mechanism, connections for at times moving the control member to separate the parts of the adjustment mechanism, and means for automatically disconnecting the control member from the adjustment mechanism when the parts thereof have been separated a predetermined distance.

7. A brake comprising a brake drum, a pair of brake shoes having brake lining associated therewith, means for applying the shoe to the drum, an adjusting device between the shoes at one end thereof and arranged to increase the distance between the ends of the shoes as the brake lining wears, an element for actuating the said adjusting device, and a cam on the adjusting device for moving the said element to prevent further adjustment after the brakes have been spread a predetermined distance by the adjusting device.

RUDOLPH A. GOEPFRICH.